(12) United States Patent
Prasad

(10) Patent No.: US 10,086,809 B1
(45) Date of Patent: Oct. 2, 2018

(54) AUTOMATIC BRAKING SYSTEM

(71) Applicant: Delphi Technologies, Inc., Troy, MI (US)

(72) Inventor: Premchand Krishna Prasad, Carmel, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 15/584,779

(22) Filed: May 2, 2017

(51) Int. Cl.
| | |
|---|---|
| *B60T 7/20* | (2006.01) |
| *B60T 7/22* | (2006.01) |
| *G08G 1/16* | (2006.01) |
| *G01S 13/93* | (2006.01) |
| *G01S 17/93* | (2006.01) |

(52) U.S. Cl.
CPC .............. *B60T 7/22* (2013.01); *G01S 13/931* (2013.01); *G01S 17/936* (2013.01); *G08G 1/165* (2013.01); *B60T 2201/022* (2013.01); *B60T 2210/32* (2013.01); *G01S 2013/9346* (2013.01)

(58) Field of Classification Search
CPC .. B60T 7/22; B60T 2201/022; B60T 2201/32; G01S 13/931; G01S 17/936; G01S 2013/9346; G08G 1/165
USPC .......................................................... 701/70
See application file for complete search history.

(56) References Cited

U.S. PATENT DOCUMENTS

| 2002/0140215 A1 | 10/2002 | Breed et al. |
|---|---|---|
| 2005/0131607 A1 | 6/2005 | Breed |
| 2007/0193798 A1* | 8/2007 | Allard ........................ B60T 7/22 180/169 |
| 2008/0003575 A1* | 1/2008 | Michalik ............ C12N 15/1003 435/6.12 |
| 2014/0035775 A1* | 2/2014 | Zeng ...................... G01S 13/867 342/52 |

(Continued)

FOREIGN PATENT DOCUMENTS

EP 3 040 909 A1 7/2016

OTHER PUBLICATIONS

U.S. Appl. No. 15/084,914, filed Mar. 30, 2016, entitled "Object Detection Using Radar and Vision Defined Image Detection Zone".

(Continued)

*Primary Examiner* — Marthe Y Marc-Coleman
(74) *Attorney, Agent, or Firm* — Laurence D. Hazelton

(57) ABSTRACT

A braking system suitable for use on an automated vehicle includes a ranging-sensor, a braking-actuator, and a controller. The ranging-sensor detects reflections indicative of objects present in a field-of-view proximate to a host-vehicle. The braking-actuator controls movement of the host-vehicle. The controller is in communication with the ranging-sensor and the braking-actuator. The controller determines a region-of-interest within the field-of-view and defines an occupancy-grid that segregates the field-of-view into an array of grid-cells. The controller further determines a repeatability-of-detection of each of the grid-cells based on reflections detected by the ranging-sensor. The controller further determines that a rigid-object is present in the field-of-view when each of a string of the grid-cells are characterized by the repeatability-of-detection greater than a repeatability-threshold. The controller activates the braking-actuator when the string intersects the region-of-interest.

15 Claims, 4 Drawing Sheets

(56) References Cited

U.S. PATENT DOCUMENTS

2015/0336575 A1\* 11/2015 Zeng .................. B62D 15/0265
                                                                                            701/41
2016/0349755 A1\* 12/2016 Kuwahara ............. B60W 40/13

OTHER PUBLICATIONS

U.S. Appl. No. 15/407,419, filed Jan. 17, 2017, entitled "Object Detection System".

\* cited by examiner

AUTOMATIC BRAKING SYSTEM

TECHNICAL FIELD OF INVENTION

This disclosure generally relates to an automatic braking system, and more particularly relates to an automatic braking system that distinguishes between rigid objects and non-rigid objects.

BACKGROUND OF INVENTION

It is known deploy automatic braking systems on automobiles to prevent collisions with objects that are detected a path of the automobile. Typical automatic braking systems detect stationary and/or moving objects that may, or may not, present a safety concern should the automobile encroach on the objects (e.g. tall grass versus a lamp post).

SUMMARY OF THE INVENTION

In accordance with one embodiment, a braking system suitable for use on an automated vehicle is provided. The braking system includes a ranging-sensor, a braking-actuator, and a controller. The ranging-sensor detects reflections indicative of objects present in a field-of-view proximate to a host-vehicle. The braking-actuator controls movement of the host-vehicle. The controller is in communication with the ranging-sensor and the braking-actuator. The controller determines a region-of-interest within the field-of-view and defines an occupancy-grid that segregates the field-of-view into an array of grid-cells. The controller further determines a repeatability-of-detection of each of the grid-cells based on reflections detected by the ranging-sensor. The controller further determines that a rigid-object is present in the field-of-view when each of a string of the grid-cells are characterized by the repeatability-of-detection greater than a repeatability-threshold. The controller activates the braking-actuator when the string intersects the region-of-interest.

In another embodiment, a method of operating a braking system suitable for using in an automated vehicle is provided. The method includes detecting reflections, controlling movement, determining a region-of-interest, defining an occupancy-grid, determining a repeatability-of-detection, determining that a rigid-object is present, and activating the braking-actuator. The step of detecting reflections includes detecting, using a ranging-sensor, reflections indicative of objects present in a field-of-view proximate to a host-vehicle. The step of controlling movement includes controlling movement of the host-vehicle using a braking-actuator. The step of determining a region-of-interest includes determining, with a controller in communication with the ranging-sensor and the braking-actuator, a region-of-interest within the field-of-view. The step of defining an occupancy-grid includes defining the occupancy-grid that segregates the field-of-view into an array of grid-cells. The step of determining a repeatability-of-detection includes determining the repeatability-of-detection of each of the grid-cells based on reflections detected by the ranging-sensor. The step of determining that a rigid-object is present includes determining that the rigid-object is present in the field-of-view when each of a string of the grid-cells are characterized by the repeatability-of-detection greater than a repeatability-threshold. The step of activating the braking-actuator includes activating the braking-actuator when the string intersects the region-of-interest.

In yet another embodiment, an automated vehicular braking system is provided. The automated vehicular braking system includes a ranging-sensor, a braking-actuator, and a controller. The controller is in communication with the ranging-sensor and the braking-actuator. The controller captures a series of detection-patterns from the ranging-sensor to detect a potential obstruction. The controller further compares the detection-patterns to determine a rate of consistency, and engages the braking-actuator when the rate of consistency exceeds a pre-determined threshold.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
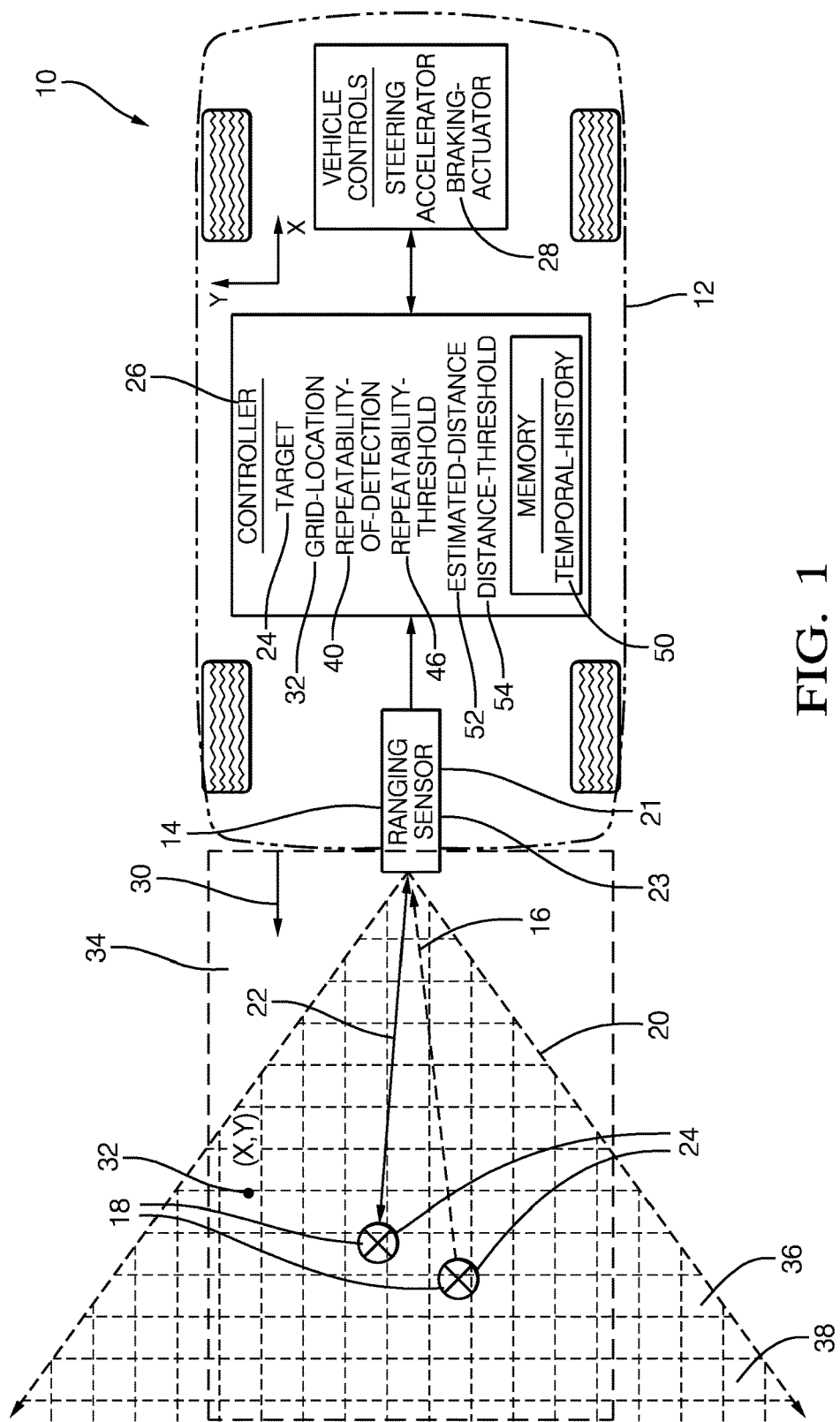
FIG. 1 is an illustration of an automatic braking system in accordance with one embodiment.

FIG. 1 illustrates a non-limiting example of a braking-system 10, hereafter referred to as the system 10, suitable for use on an automated vehicle, hereafter referred to as the host-vehicle 12. The system 10 includes a ranging-sensor 14 that detects reflections 16 indicative of objects 18 present in a field-of-view 20 proximate to the host-vehicle 12. As will be described in more detail below, the system 10 is an improvement over prior braking systems because the system 10 is configured to more accurately determine a difference between an object-of-interest (e.g. a curb) and an object-of-noninterest (e.g. grass) using the ranging-sensor 14. As used herein, the term 'automated vehicle' is not meant to suggest that fully automated or autonomous operation of the host-vehicle 12 is required. It is contemplated that the teachings presented herein are applicable to instances where the host-vehicle 12 is entirely manually operated by a human and the automation is merely providing emergency braking to the human.

The ranging-sensor 14 may be a radar-sensor 21, a lidar-sensor 23, an ultrasonic-sensor (not shown), or any combination thereof. Typically, radar-systems on vehicles are capable of only determining a range 22 and azimuth-angle (e.g. left/right angle, not shown) to a target 24 so may be referred to as a two-dimensional (2D) radar-system. Other radar-systems are capable of determining an elevation-angle to a target 24 so may be referred to as a three-dimensional (3D) radar-system. In the non-limiting example illustrated in FIG. 1, the ranging-sensor 14 is a 2D radar-sensor 21. A radar-sensor-system with a similarly configured radar-sensor 21 is available from Delphi Inc. of Troy, Mich., USA and marketed as an Electronically Scanning Radar (ESR), Short Range Radar (SRR), or a Rear-Side-Detection-System (RSDS). It is contemplated that the teachings presented herein are applicable to both 2D radar-systems and 3-D radar-systems with one or more sensor devices, i.e. multiple instances of the radar-sensor 21. The radar-sensor 21 is generally configured to detect the reflection 16 of a radar-signal (not shown) that may include data indicative of the detected target 24 proximate to the host-vehicle 12. As used herein, the detected target 24 may be the object 18 that is detected by the radar-sensor 21 and tracked by a controller 26, as will be described below.

By way of example and not limitation, the radar-sensor 21 may be configured to output a continuous or periodic data stream that includes a variety of signal characteristics associated with each target 24 detected. The signal characteristics may include or be indicative of, but are not limited to, the range 22 to the target 24 from the host-vehicle 12, the azimuth-angle to the target 24 relative to a host-vehicle-longitudinal-axis (not shown), an amplitude (not shown) of the radar-signal detected by the radar-sensor 21, and a relative-velocity of closure (i.e. a range-rate, not shown) relative to the target 24.

The system 10 also includes a braking-actuator 28 that controls movement 30 of the host-vehicle 12. Movement 30 may be defined as forward-movement and/or rearward-movement of the host-vehicle 12. In the non-limiting examples illustrated in FIGS. 1-2 the movement 30 is rearward-movement, that is, the host-vehicle 12 is performing a backing-maneuver. The braking-actuator 28 may be installed on each wheel of the host-vehicle 12 and may be a friction-device. The braking-actuator 28 may also be an electric-motor that may utilize regenerative-braking that may exist on hybrid-electric-vehicles or electric-vehicles, as will be understood by one skilled in the art.

The system 10 also includes the controller 26 in communication with the ranging-sensor 14 and the braking-actuator 28. The controller 26 may include a processor (not shown) such as a microprocessor or other control circuitry such as analog and/or digital control circuitry including an application specific integrated circuit (ASIC) for processing data as should be evident to those in the art. The controller 26 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the object 18 is going to be in the intended path of the host-vehicle 12 based on signals received by the controller 26 from the ranging-sensor 14 as described herein.

The controller 26 may analyze the radar-signal to categorize the data from each detected target 24 with respect to a list of previously detected targets 24 having established tracks. As used herein, a track refers to one or more data sets that have been associated with a particular one of the detected targets 24. By way of example and not limitation, if the amplitude of the radar-signal is above a predetermined amplitude threshold, then the controller 26 determines if the data corresponds to a previously detected target 24 or if a new-target has been detected. If the data corresponds to a previously detected target 24, the data is added to or combined with prior data to update the track of the previously detected target 24. If the data does not correspond to any previously detected target 24 because, for example, it is located too far away from any previously detected target 24, then it may be characterized as a new-target and assigned a unique track identification number. The identification number may be assigned according to the order that data for a new detected target 24 is received, or may be assigned an identification number according to a grid-location 32 in the field-of-view 20.

The controller 26 may determine a region-of-interest 34 within the field-of-view 20. As illustrated in FIG. 1, the region-of-interest 34 may represent an area directly behind the host-vehicle 12 that extends from a left-corner and from a right-corner of the host-vehicle 12. The objects 18 in the region-of-interest 34 and the host-vehicle 12 will collide if the host-vehicle 12 continues to move in the direction of the objects 18. The field-of-view 20 also has a known vertical-angle (not shown) and a known horizontal-angle (not specifically shown) that are design features of the ranging-sensor 14 and determine how close to the host-vehicle 12 the objects 18 may be detected.

The controller 26 may define an occupancy-grid 36 that segregates the field-of-view 20 into an array of grid-cells 38 (FIG. 1). As mentioned previously, the controller 26 may assign the identification number to the detected target 24 in the grid-location 32 that is associated with unique grid-cells 38. A dimension of the individual grid-cell 38 may be of any size and is advantageously not greater than five centimeters (5 cm) on each side.

The controller 26 periodically updates the detections within the grid-cells 38 and determines a repeatability-of-detection 40 of each of the grid-cells 38 based on the reflections 16 detected by the ranging-sensor 14. The repeatability-of-detection 40 corresponds to a history of detections within the grid-cells 38, where a larger number of detections (i.e. more persistent detections) increases the certainty that the target 24 resides in the occupancy-grid 36.

Figure 2:
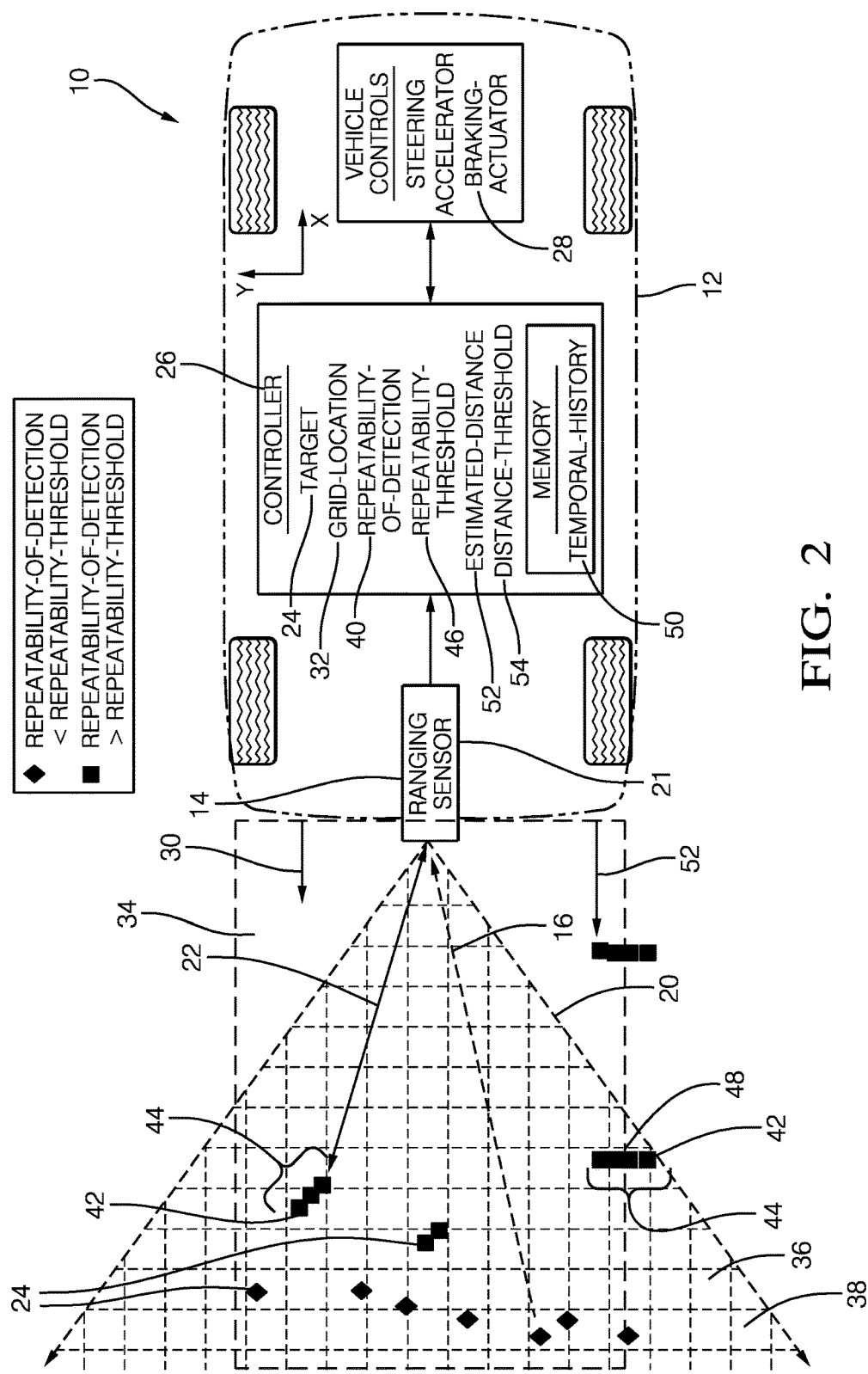
FIG. 2 is an illustration of the automatic braking system of FIG. 1 in accordance with one embodiment.

The controller 26 may determine that a rigid-object 42 (i.e. a curb, a lamp post, etc.) is present in the field-of-view 20 when each of a string 44 of the grid-cells 38 are characterized by the repeatability-of-detection 40 greater than a repeatability-threshold 46, which are illustrated in FIG. 2 by solid grid-cells 38. Grid-cells 38 that are characterized by the repeatability-of-detection 40 less than a repeatability-threshold 46 are illustrated by vertical lines within the grid-cell 38. As illustrated in FIG. 2, the string 44 of grid-cells 38 may be three or more grid-cells 38 that border one another. Experimentation by the inventors has discovered that the repeatability-threshold 46 of two detections in a grid-cell 38 may be indicative of the presence of the rigid-object 42.

The controller 26 may activate the braking-actuator 28 when the string 44 of grid-cells 38 intersects 48 the region-of-interest 34 to prevent the host-vehicle 12 from colliding with the rigid-object 42. The controller 26 may not activate the braking-actuator 28 when the grid-cells 38 are characterized by the repeatability-of-detection 40 less than the repeatability-threshold 46, which may be indicative of grass or similar objects 18 that typically present random and/or less persistent reflections 16 of the radar-signal.

The controller 26 may store a temporal-history 50 of the occupancy-grid 36 in the memory and further determine an estimated-distance 52 to the rigid-object 42 based on the temporal-history 50. The controller 26 may activate the braking-actuator 28 when the rigid-object 42 has moved out of the field-of-view 20 and the estimated-distance 52 is less than a distance-threshold 54, as illustrated in FIG. 2. The distance-threshold 54 may be any user-defined length within the region-of-interest 34 and may be zero meters, representing the object 18 is located at a vertical-projection of a bumper (not shown) of the host-vehicle 12. The controller 26 may identify a last-known-distance (not shown) at a moment in time when the rigid-object 42 is no longer detected in the field-of-view 20. The controller 26 may also determine the estimated-distance 52 from the host-vehicle 12 to the rigid-object 42 based on the last-known-distance and the range-rate determined when the rigid-object 42 has exited the field-of-view 20. By combining the last-known-distance with a known length of the object 18, the estimated-distance 52 may be determined and may be updated in the controller 26 based on a velocity (not shown) of the host-vehicle 12, as will be understood by one skilled in the art. The controller 26 may also determine the estimated-distance 52 by tracking the range 22 to an other-target (not shown) in the field-of-view 20 after the rigid-object 42 has exited the field-of-view 20, and update the estimated-distance 52 as the host-vehicle 12 moves relative to the other-target. The controller 26 may also determine the estimated-distance 52 by counting pulses from a wheel-sensor (not shown) after the rigid-object 42 has exited the field-of-view 20, and update the estimated-distance 52 based on the number of pulses and a direction of wheel-rotation (not shown). The controller 26 may also determine the estimated-distance 52 by based on a Global Positioning System (GPS) signal (not shown) after the rigid-object 42 has exited the field-of-view 20, and update the estimated-distance 52 based on the global-position of the host-vehicle 12.

Figure 3:
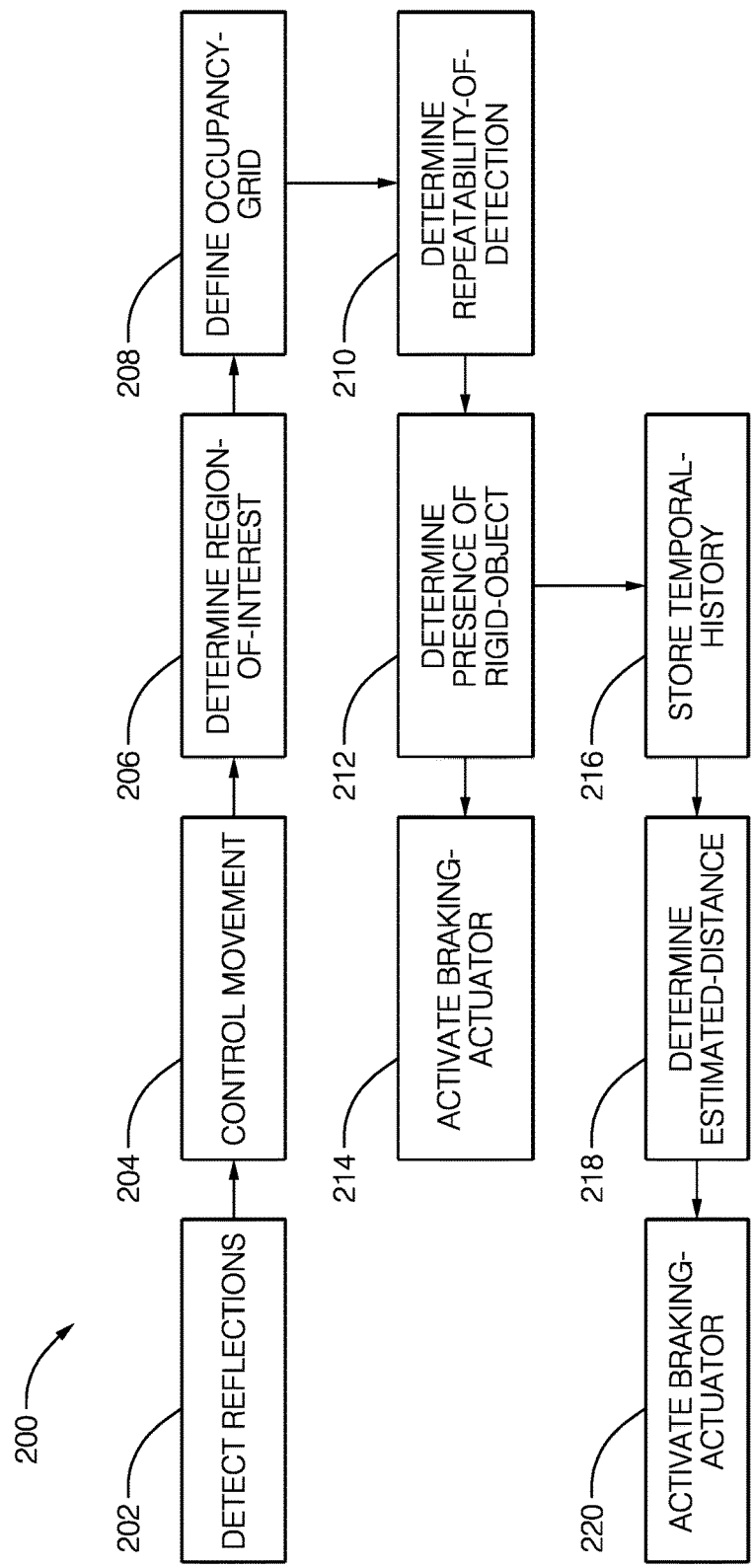
FIG. 3 is a flow chart illustrating a method of operating the automatic braking system of FIG. 1 in accordance with another embodiment.

FIG. 3 illustrates a non-limiting example of a method 200 of operating a braking system 10 suitable for using in an automated vehicle.

Step 202, DETECT REFLECTIONS, may include detecting, using a ranging-sensor 14, reflections 16 indicative of objects 18 present in a field-of-view 20 proximate to a host-vehicle 12. The ranging-sensor 14 may be a radar-sensor 21, a lidar-sensor 23, an ultrasonic-sensor (not shown), or any combination thereof. Typically, radar-systems on vehicles are capable of only determining a range 22 and azimuth-angle (e.g. left/right angle, not shown) to the target 24 so may be referred to as a two-dimensional (2D) radar-system. Other radar-systems are capable of determining an elevation-angle to the target 24 so may be referred to as a three-dimensional (3D) radar-system. In the non-limiting example illustrated in FIG. 1, the ranging-sensor 14 is a 2D radar-sensor 21. A radar-sensor-system with a similarly configured radar-sensor 21 is available from Delphi Inc. of Troy, Mich., USA and marketed as an Electronically Scanning Radar (ESR), Short Range Radar (SRR), or a Rear-Side-Detection-System (RSDS). It is contemplated that the teachings presented herein are applicable to both 2D radar-systems and 3-D radar-systems with one or more sensor devices, i.e. multiple instances of the radar-sensor 21. The radar-sensor 21 is generally configured to detect the reflection 16 of a radar-signal (not shown) that may include data indicative of the detected target 24 proximate to the host-vehicle 12. As used herein, the detected target 24 may be the object 18 that is detected by the radar-sensor 21 and tracked by a controller 26, as will be described below.

By way of example and not limitation, the radar-sensor 21 may be configured to output a continuous or periodic data stream that includes a variety of signal characteristics associated with each target 24 detected. The signal characteristics may include or be indicative of, but are not limited to, the range 22 to the target 24 from the host-vehicle 12, the azimuth-angle to the target 24 relative to a host-vehicle-longitudinal-axis (not shown), an amplitude (not shown) of the radar-signal detected by the radar-sensor 21, and a relative-velocity of closure (i.e. a range-rate, not shown) relative to the target 24.

Step 204, CONTROL MOVEMENT, may include controlling movement 30 of the host-vehicle 12 using a braking-actuator 28. Movement 30 may be defined as forward-movement and/or rearward-movement of the host-vehicle 12. In the non-limiting examples illustrated in FIGS. 1-2 the movement 30 is rearward-movement, that is, the host-vehicle 12 is performing a backing-maneuver. The braking-actuator 28 may be installed on each wheel of the host-vehicle 12 and may be a friction-device. The braking-actuator 28 may also be an electric-motor that may utilize regenerative-braking that may exist on hybrid-electric-vehicles or electric-vehicles, as will be understood by one skilled in the art.

Step 206, DETERMINE REGION-OF-INTEREST, may include determining, with a controller 26 in communication with the ranging-sensor 14 and the braking-actuator 28, a region-of-interest 34 within the field-of-view 20. The controller 26 may include a processor (not shown) such as a microprocessor or other control circuitry such as analog and/or digital control circuitry including an application specific integrated circuit (ASIC) for processing data as should be evident to those in the art. The controller 26 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the object 18 is going to be in the intended path of the host-vehicle 12 based on signals received by the controller 26 from the ranging-sensor 14 as described herein.

The controller 26 may analyze the radar-signal to categorize the data from each detected target 24 with respect to a list of previously detected targets 24 having established tracks. As used herein, a track refers to one or more data sets that have been associated with a particular one of the detected targets 24. By way of example and not limitation, if the amplitude of the radar-signal is above a predetermined amplitude threshold, then the controller 26 determines if the data corresponds to a previously detected target 24 or if a new-target has been detected. If the data corresponds to a previously detected target 24, the data is added to or combined with prior data to update the track of the previously detected target 24. If the data does not correspond to any previously detected target 24 because, for example, it is located too far away from any previously detected target 24, then it may be characterized as a new-target and assigned a unique track identification number. The identification number may be assigned according to the order that data for a new detected target 24 is received, or may be assigned an identification number according to a grid-location 32 in the field-of-view 20.

As illustrated in FIG. 1, the region-of-interest 34 may represent an area directly behind the host-vehicle 12 that extends from a left-corner and from a right-corner of the host-vehicle 12. The objects 18 in the region-of-interest 34 and the host-vehicle 12 will collide if the host-vehicle 12 continues to move in the direction of the objects 18. The field-of-view 20 also has a known vertical-angle (not shown) and a known horizontal-angle (not specifically shown) that are design features of the ranging-sensor 14 and determine how close to the host-vehicle 12 the objects 18 may be detected.

Step 208, DEFINE OCCUPANCY-GRID, may include defining an occupancy-grid 36 that segregates the field-of-view 20 into an array of grid-cells 38. As mentioned previously, the controller 26 may assign the identification number to the detected target 24 in the grid-location 32 that is associated with unique grid-cells 38. A dimension of the individual grid-cell 38 may be of any size and is advantageously not greater than five centimeters (5 cm) on each side.

Step 210, DETERMINE REPEATABILITY-OF-DETECTION, may include determining a repeatability-of-detection 40 of each of the grid-cells 38 based on reflections 16 detected by the ranging-sensor 14. The repeatability-of-detection 40 corresponds to a history of detections within the grid-cells 38, where a larger number of detections (i.e. more persistent detections) increases the certainty that the target 24 resides in the occupancy-grid 36. The controller 126 may periodically update the detections within the grid-cells 38 and store the data in the memory of the controller 26.

Step 212, DETERMINE PRESENCE OF RIGID-OBJECT, may include determining that a rigid-object 42 (i.e. a curb, a lamp post, etc.) is present in the field-of-view 20 when each of a string 44 of the grid-cells 38 are characterized by the repeatability-of-detection 40 greater than a repeatability-threshold 46, which are illustrated in FIG. 2 by solid grid-cells 38. Grid-cells 38 that are characterized by the repeatability-of-detection 40 less than a repeatability-threshold 46 are illustrated by vertical lines within the grid-cell 38. As illustrated in FIG. 2, the string 44 of grid-cells 38 may be three or more grid-cells 38 that border one another. Experimentation by the inventors has discovered that the repeatability-threshold 46 of two detections in a grid-cell 38 may be indicative of the presence of the rigid-object 42.

Step 214, ACTIVATE BRAKING-ACTUATOR, may include activating the braking-actuator 28 when the string 44 of grid-cells 38 intersects 48 the region-of-interest 34 to prevent the host-vehicle 12 from colliding with the rigid-object 42. The controller 26 may not activate the braking-actuator 28 when the grid-cells 38 are characterized by the repeatability-of-detection 40 less than the repeatability-threshold 46, which may be indicative of grass or similar objects 18 that typically present random and/or less persistent reflections 16 of the radar-signal.

Step 216, STORE TEMPORAL-HISTORY, may include storing a temporal-history 50 of the occupancy-grid 36 in the memory of the controller 26.

Step 218, DETERMINE ESTIMATED-DISTANCE, may include determining, with the controller 26, an estimated-distance 52 to the rigid-object 42 based on the temporal-history 50. The controller 26 may identify a last-known-distance (not shown) at a moment in time when the rigid-object 42 is no longer detected in the field-of-view 20. The controller 26 may also determine the estimated-distance 52 from the host-vehicle 12 to the rigid-object 42 based on the last-known-distance and the range-rate determined when the rigid-object 42 has exited the field-of-view 20. By combining the last-known-distance with a known length of the object 18, the estimated-distance 52 may be determined and may be updated in the controller 26 based on a velocity (not shown) of the host-vehicle 12, as will be understood by one skilled in the art. The controller 26 may also determine the estimated-distance 52 by tracking the range 22 to an other-target (not shown) in the field-of-view 20 after the rigid-object 42 has exited the field-of-view 20, and update the estimated-distance 52 as the host-vehicle 12 moves relative to the other-target. The controller 26 may also determine the estimated-distance 52 by counting pulses from a wheel-sensor (not shown) after the rigid-object 42 has exited the field-of-view 20, and update the estimated-distance 52 based on the number of pulses and a direction of wheel-rotation (not shown). The controller 26 may also determine the estimated-distance 52 by based on a Global Positioning System (GPS) signal (not shown) after the rigid-object 42 has exited the field-of-view 20, and update the estimated-distance 52 based on the global-position of the host-vehicle 12.

Step 220, ACTIVATE BRAKING-ACTUATOR, may include activating the braking-actuator 28 when the rigid-object 42 has moved out of the field-of-view 20 and the estimated-distance 52 is less than a distance-threshold 54. The distance-threshold 54 may be any user-defined length within the region-of-interest 34 and may be zero meters, representing the object 18 is located at a vertical-projection of a bumper (not shown) of the host-vehicle 12.

Figure 4:
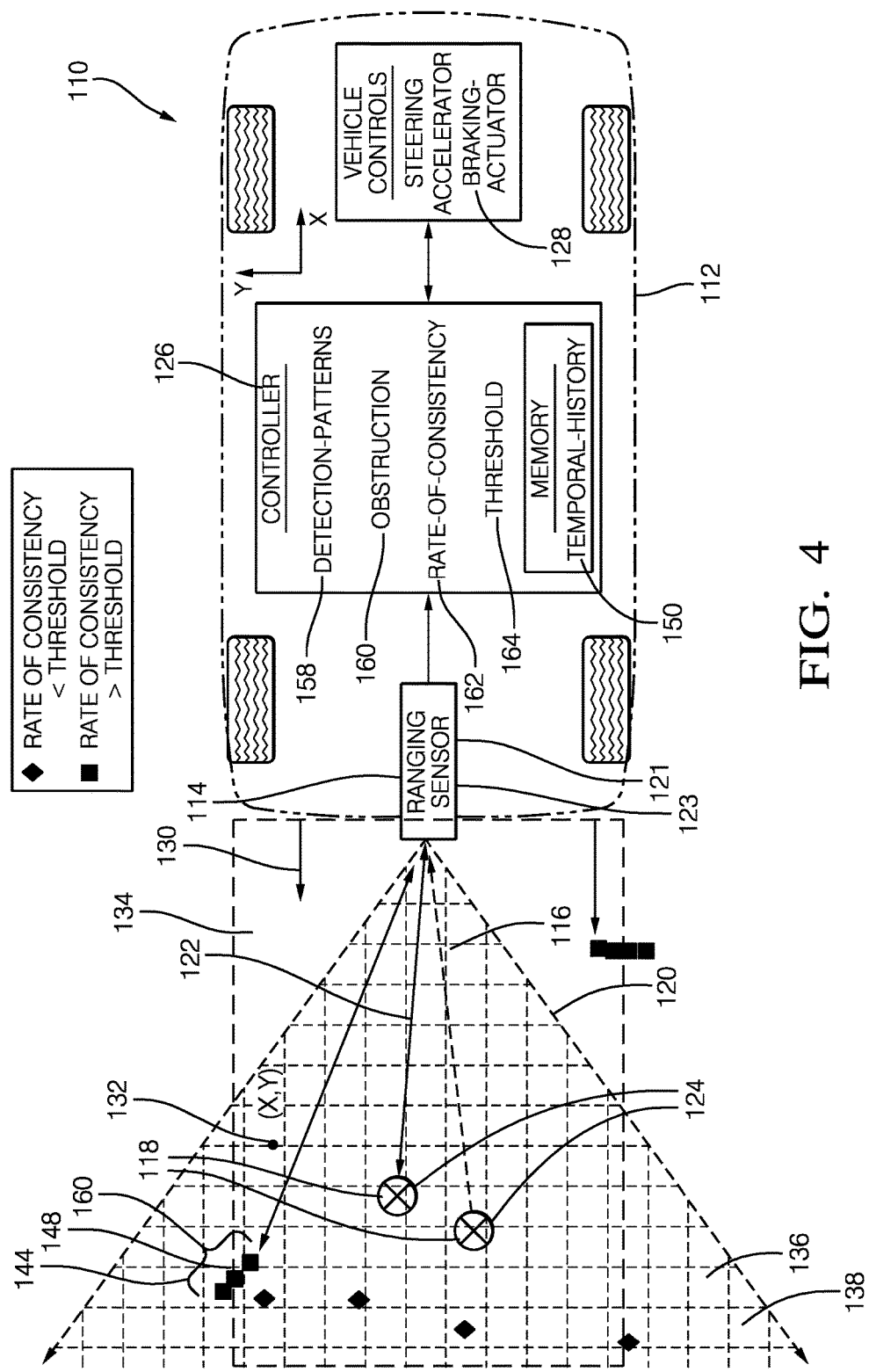
FIG. 4 is an illustration of an automated vehicular braking system in accordance with yet another embodiment.

FIG. 4 illustrates another embodiment of a non-limiting example of an automated vehicular braking-system 110, hereafter referred to as the system 110, suitable for use on an automated vehicle, hereafter referred to as the host-vehicle 112. The system 110 includes a ranging-sensor 114, a braking-actuator 128, and a controller 126 in communication with the ranging-sensor 114 and the braking-actuator 128.

The ranging-sensor 114 may be a radar-sensor 121, a lidar-sensor 123, an ultrasonic-sensor (not shown), or any combination thereof. Typically, radar-systems on vehicles are capable of only determining a range 122 and azimuth-angle (e.g. left/right angle, not shown) to a target 124 so may be referred to as a two-dimensional (2D) radar-system. Other radar-systems are capable of determining an elevation-angle to the target 124 so may be referred to as a three-dimensional (3D) radar-system. In the non-limiting example illustrated in FIG. 4, the ranging-sensor 114 is a 2D radar-sensor 121. A radar-sensor-system with a similarly configured radar-sensor 121 is available from Delphi Inc. of Troy, Mich., USA and marketed as an Electronically Scanning Radar (ESR), Short Range Radar (SRR), or a Rear-Side-Detection-System (RSDS). It is contemplated that the teachings presented herein are applicable to both 2D radar-systems and 3-D radar-systems with one or more sensor devices, i.e. multiple instances of the radar-sensor 121. The radar-sensor 121 is generally configured to detect a reflection 116 of a radar-signal (not shown) that may include data indicative of the detected target 124 proximate to the host-vehicle 112. As used herein, the detected target 124 may be an object 118 that is detected by the radar-sensor 121 and tracked by the controller 126, as will be described below.

By way of example and not limitation, the radar-sensor 121 may be configured to output a continuous or periodic data stream that includes a variety of signal characteristics associated with each target 124 detected. The signal characteristics may include or be indicative of, but are not limited to, the range 122 to the target 124 from the host-vehicle 112, the azimuth-angle to the target 124 relative to a host-vehicle-longitudinal-axis (not shown), an amplitude (not shown) of the radar-signal detected by the radar-sensor 21, and a relative-velocity of closure (i.e. a range-rate, not shown) relative to the target 124.

The braking-actuator 128 controls movement 130 of the host-vehicle 112. Movement 130 may be defined as forward-movement and/or rearward-movement of the host-vehicle 112. In the non-limiting example illustrated in FIG. 4 the movement 130 is rearward-movement, that is, the host-vehicle 112 is performing a backing-maneuver. The braking-actuator 128 may be installed on each wheel of the host-vehicle 112 and may be a friction-device. The braking-actuator 128 may also be an electric-motor that may utilize regenerative-braking that may exist on hybrid-electric-vehicles or electric-vehicles, as will be understood by one skilled in the art.

The controller 126 may capture a series of detection-patterns 158 from the ranging-sensor 114 to detect a potential obstruction 160. The controller 126 may include a processor (not shown) such as a microprocessor or other control circuitry such as analog and/or digital control circuitry including an application specific integrated circuit (ASIC) for processing data as should be evident to those in the art. The controller 126 may include a memory (not specifically shown), including non-volatile memory, such as electrically erasable programmable read-only memory (EEPROM) for storing one or more routines, thresholds, and captured data. The one or more routines may be executed by the processor to perform steps for determining if a detected instance of the object 118 is going to be in the intended path of the host-vehicle 112 based on signals received by the controller 126 from the ranging-sensor 114 as described herein.

The controller 126 may analyze the radar-signal to categorize the data from each detected target 124 with respect to a list of previously detected targets 124 having established tracks. As used herein, a track refers to one or more data sets that have been associated with a particular one of the detected targets 124. By way of example and not limitation, if the amplitude of the radar-signal is above a predetermined amplitude threshold, then the controller 126 determines if the data corresponds to a previously detected target 124 or if a new-target has been detected. If the data corresponds to a previously detected target 124, the data is added to or combined with prior data to update the track of the previously detected target 124. If the data does not correspond to any previously detected target 124 because, for example, it is located too far away from any previously detected target 124, then it may be characterized as a new-target and assigned a unique track identification number. The identification number may be assigned according to the order that data for a new detected target 124 is received, or may be assigned an identification number according to a grid-location 132 in the field-of-view 120.

The controller 126 may determine a region-of-interest 134 within the field-of-view 120. As illustrated in FIG. 4, the region-of-interest 134 may represent an area directly behind the host-vehicle 112 that extends from a left-corner and from a right-corner of the host-vehicle 112. The objects 118 in the region-of-interest 134 and the host-vehicle 112 will collide if the host-vehicle 112 continues to move in the direction of the objects 118. The field-of-view 120 also has a known vertical-angle (not shown) and a known horizontal-angle (not specifically shown) that are design features of the ranging-sensor 114 and determine how close to the host-vehicle 112 the objects 118 may be detected.

The controller 126 may define an occupancy-grid 136 that segregates the field-of-view 120 into an array of grid-cells 138 (FIG. 4). As mentioned previously, the controller 126 may assign the identification number to the detected target 124 in the grid-location 132 that is associated with unique grid-cells 138. A dimension of the individual grid-cell 138 may be of any size and is advantageously not greater than five centimeters (5 cm) on each side.

The controller 126 may periodically update and compare the detection-patterns 158 within the grid-cells 138 to determine a rate-of-consistency 162 of each of the grid-cells 138 based on the reflections 116 detected by the ranging-sensor 114. The rate-of-consistency 162 corresponds to a history of detections within the grid-cells 138, where a larger number of detections (i.e. more persistent detections) increases the certainty that the target 124 resides in the occupancy-grid 136. The controller 126 may determine the obstruction 160 (i.e. a curb, a lamp post, etc.) is present in the field-of-view 120 when each of a string 144 of the grid-cells 138 are characterized by the rate-of-consistency 162 greater than the predetermined threshold 164, which are illustrated in FIG. 4 by solid grid-cells 138. Grid-cells 138 that are characterized by the rate-of-consistency 162 less than a predetermined threshold 164 are illustrated by vertical lines within the grid-cell 138. As illustrated in FIG. 4, the string 144 of grid-cells 138 may be three or more grid-cells 138 that border one another. Experimentation by the inventors has discovered that the predetermined threshold 164 of two detections in a grid-cell 138 may be indicative of the presence of the obstruction 160.

The controller 126 may engage the braking-actuator 128 when the rate-of-consistency 162 exceeds the pre-determined threshold 164, and when the string 144 of grid-cells 138 intersects 148 the region-of-interest 134 to prevent the host-vehicle 112 from colliding with the obstruction 160. The controller 126 may not activate the braking-actuator 128 when the grid-cells 138 are characterized by the rate-of-consistency 162 less than the pre-determined threshold 164, which may be indicative of grass or similar objects 118 that typically present random and/or less persistent reflections 116 of the radar-signal.

Accordingly, An automatic braking system 10, a controller 26 for the automatic braking system 10 and a method 200 of operating the automatic braking system 10 is provided. The automatic braking system 10 is an improvement over prior art systems because it may distinguish between rigid-objects 42 (i.e. curbs and lamp poles) and non-rigid-objects (i.e. grass), and reduce false automatic braking events.

While this invention has been described in terms of the preferred embodiments thereof, it is not intended to be so limited, but rather only to the extent set forth in the claims that follow.

We claim:

1. A braking system suitable for use on an automated vehicle, said system comprising:
   a ranging-sensor that detects reflections indicative of objects present in a field-of-view proximate to a host-vehicle;
   a braking-actuator that controls movement of the host-vehicle; and
   a controller in communication with the ranging-sensor and the braking-actuator, said controller determines a region-of-interest within the field-of-view, defines an occupancy-grid that segregates the field-of-view into an array of grid-cells, determines a repeatability-of-detection of each of the grid-cells based on reflections detected by the ranging-sensor, determines that a rigid-object is present in the field-of-view when each of a string of the grid-cells are characterized by the repeatability-of-detection greater than a repeatability-threshold, and activates the braking-actuator when the string intersects the region-of-interest; wherein the string includes at least three grid-cells.

2. The system in accordance with claim 1, wherein the controller includes a memory and a temporal-history of the occupancy-grid is stored in the memory.

3. The system in accordance with claim 2, wherein the controller further determines an estimated-distance to the rigid-object based on the temporal-history and activates the braking-actuator when the rigid-object has moved out of the field-of-view and the estimated-distance is less than a distance-threshold.

4. The system in accordance with claim 1, wherein a dimension of the grid-cell is not greater than five centimeters on each side.

5. The system in accordance with claim 4, wherein the repeatability-threshold is at least two detections in a grid-cell.

6. The system in accordance with claim 1, wherein the ranging-sensor is a radar-sensor.

7. The system in accordance with claim 1, wherein the ranging-sensor is a lidar-sensor.

8. A method of operating a braking system suitable for using in an automated vehicle, said method comprising:
    detecting, using a ranging-sensor, reflections indicative of objects present in a field-of-view proximate to a host-vehicle;
    controlling movement of the host-vehicle using a braking-actuator; and
    determining, with a controller in communication with the ranging-sensor and the braking-actuator, a region-of-interest within the field-of-view, defining an occupancy-grid that segregates the field-of-view into an array of grid-cells, determining a repeatability-of-detection of each of the grid-cells based on reflections detected by the ranging-sensor, determining that a rigid-object is present in the field-of-view when each of a string of the grid-cells are characterized by the repeatability-of-detection greater than a repeatability-threshold, and activating the braking-actuator when the string intersects the region-of-interest; wherein the string includes at least three grid-cells.

9. The method in accordance with claim 8, wherein the controller includes a memory, further comprising the step of storing a temporal-history of the occupancy-grid in the memory.

10. The method in accordance with claim 9, further comprising the step of determining with the controller an estimated-distance to the rigid-object based on the temporal-history and activating the braking-actuator when the rigid-object has moved out of the field-of-view and the estimated-distance is less than a distance-threshold.

11. The method in accordance with claim 8, wherein a dimension of the grid-cell is five centimeters or less on each side.

12. The method in accordance with claim 11, wherein the repeatability-threshold is at least 2 detections in a grid-cell.

13. The method in accordance with claim 8, wherein the ranging-sensor is a radar-sensor.

14. The method in accordance with claim 8, wherein the ranging-sensor is a lidar-sensor.

15. An automated vehicular braking system comprising:
    a ranging-sensor;
    a braking-actuator; and
    a controller in communication with the ranging-sensor and the braking-actuator, wherein said controller captures a series of detection-patterns from the ranging-sensor and assigns the detection-patterns into an array of grid-cells to detect a potential obstruction, compares the detection-patterns to determine a rate-of-consistency, and engages the braking-actuator when the rate-of-consistency within a string of at least three grid-cells exceeds a pre-determined threshold.

\* \* \* \* \*